United States Patent
Takeuchi et al.

[11] Patent Number: 6,021,673
[45] Date of Patent: Feb. 8, 2000

[54] SEMICONDUCTOR PRESSURE DETECTING DEVICE

[75] Inventors: Takanobu Takeuchi; Motomi Ichihashi, both of Tokyo, Japan

[73] Assignee: Mitsubishi Denki Kabushiki Kaisha, Tokyo, Japan

[21] Appl. No.: 09/135,857

[22] Filed: Aug. 18, 1998

[30] Foreign Application Priority Data

Feb. 6, 1998  [JP]  Japan ................... 10-025446

[51] Int. Cl.⁷ .................. G01L 9/20; G01L 9/16
[52] U.S. Cl. ............................................. 73/754
[58] Field of Search .............. 73/720, 721, 726, 73/727, 754, 756; 257/410, 522, 254, 276, 750, 758

[56] References Cited

U.S. PATENT DOCUMENTS

| | | | |
|---|---|---|---|
| 4,790,192 | 12/1988 | Knecht et al. | 73/754 |
| 5,062,302 | 11/1991 | Petersen et al. | 73/754 |
| 5,454,270 | 10/1995 | Brown et al. | 73/720 |
| 5,510,645 | 4/1996 | Fitch et al. | 257/522 |

FOREIGN PATENT DOCUMENTS

| | | |
|---|---|---|
| 62-72178 | 4/1987 | Japan . |
| 2-69630 | 3/1990 | Japan . |
| 6-125096 | 5/1994 | Japan . |
| 7-23255 | 4/1995 | Japan . |
| 7-294353 | 11/1995 | Japan . |
| 7-294354 | 11/1995 | Japan . |

*Primary Examiner*—William Oen
*Attorney, Agent, or Firm*—Oblon, Spivak, McClelland, Maier & Neustadt, P.C.

[57] ABSTRACT

A semiconductor pressure detecting device comprises a package having a pressure introducing hole, a base plate which has a first through hole at the center thereof and is bonded on the periphery thereof to the inside of the package so that the first through hole becomes concentric with the pressure introduction hole, a mount which has a second through hole at the center thereof and is mounted on the base plate so that the second through hole becomes concentric with the first through hole and located inside the bonding portion of the package and the base plate, and a semiconductor pressure sensor chip, wherein the base plate has a groove which surrounds the mount at a position inside of the bonding portion.

4 Claims, 3 Drawing Sheets

SEMICONDUCTOR PRESSURE DETECTING DEVICE

BACKGROUND OF THE INVENTION

1. Field of the Invention

The present invention relates to a semiconductor pressure detecting device of strain gauge type for detecting relatively high pressures.

2. Description of the Prior Art

A semiconductor pressure detecting device of strain gauge type of the prior art is disclosed, for example, in Japanese Non-examined Patent Publication No. 7-294353. The semiconductor pressure detecting device disclosed in this publication has a pressure sensor chip 104 mounted in a recess 101a formed in a body 101 via a metal base 102 (which corresponds to a base plate of the present invention) and a glass base 103 as shown in FIG. 4, while a pressure is applied to the pressure sensor chip 104 via through holes 101a, 102a, 103a which are made concentrically in the body 101, the metal base 102 and the glass base 103, respectively. The metal base 102 is fastened onto the body 101 by welding the periphery thereof by means of laser, while a central portion is raised so that a groove 102b which is concentric with the through hole 102a can be formed inside the laser-welded portion in this prior art example, in order to prevent unnecessary stress, which is caused by thermal expansion of component parts due to the heat generated during laser welding, from being transferred to the glass base 103 and the pressure sensor chip 104.

However, there has been such a problem that the semiconductor pressure detecting device of the prior art cannot be manufactured at a low cost because considerable time is taken in the laser welding step. Although use of projection welding process may be conceived to solve this problem, there has been such a problem in this case that a joint of the base may be broken due to residual stress caused by impact or heat generated when joining. Moreover, there has also been such a problem that, when a high pressure is applied from the outside, the metal base is warped to make it impossible to obtain a sufficient margin for measuring a range of pressures up to a high pressure.

SUMMARY OF THE INVENTION

That is, an object of the present invention is to solve the problems of the prior art described above and to provide a semiconductor pressure detecting device of low cost and high reliability which is capable of measuring relatively high pressures.

The present invention has been completed through research for solving the problems of the prior art described above.

First semiconductor pressure detecting device of the present invention comprises a package having a pressure introducing hole, a base plate which has a first through hole at the center thereof and is bonded on the periphery thereof to the inside of the package so that the first through hole becomes substantially concentric with the pressure introduction hole, a mount which has a second through hole at the center thereof and is mounted on the base plate so that the second through hole becomes substantially concentric with the first through hole and located inside the bonding portion of the package and the base plate, and a semiconductor pressure sensor chip for detecting a pressure introduced through the pressure introduction hole made in the mount, the first through hole and the second through hole, wherein the base plate has a groove which surrounds the mount at a position inside of the bonding portion.

With the configuration, it is made possible to decrease deformation of the portion inside the groove of the base plate due to extraneous force and prevent an unnecessary extraneous force from being applied to the semiconductor pressure sensor chip via the mount, thus improving the reliability of the joint between the base and the base plate.

Thus the first semiconductor pressure detecting device of the present invention can be manufactured at a lower cost, because the projection welding process which can be completed in a shorter period of time can be applied to the manufacture and, because unnecessary stress can be prevented from acting on the semiconductor pressure sensor chip when a pressure is applied during operation, reliability can be improved and relatively high pressures can be measured.

In the first semiconductor pressure detecting device of the present invention, it is preferable that the groove comprise a first groove and a second groove formed to oppose each other while interposing the mount, and a third groove and a fourth groove formed to oppose each other which are formed to interpose the mount and are substantially at right angles to the first groove and the second groove, respectively.

This configuration makes it possible to more effectively suppress a deformation of the portion surrounded by the groove due to an extraneous force. Therefore reliability can be more improved and higher pressures can be measured.

Second semiconductor pressure detecting device of the present invention comprises a package having a pressure introducing hole, a base plate which has a first through hole at the center thereof and is bonded at the periphery thereof to the inside of the package so that the first through hole becomes substantially concentric with the pressure introduction hole, a mount which has a second through hole at the center thereof and is mounted on the base plate so that the second through hole becomes substantially concentric with the first through hole and located inside the bonding portion of the package and the base plate, and a semiconductor pressure sensor chip mounted on the mount for detecting a pressure introduced through the pressure introduction hole made in the mount, the first through hole and the second through hole, wherein the base plate comprises a first base plate which is bonded onto the package at the periphery of the bottom surface thereof and a second base plate which is bonded onto the first base plate inside the periphery of the top surface of the first base plate, and the semiconductor pressure sensor chip is mounted on the second base plate via the mount.

With the configuration, it is made possible to make the deformation of the second base plate due to extraneous force smaller than the deformation of the first base plate, and prevent an unnecessary extraneous force from being applied to the semiconductor pressure sensor chip via the mount, thus improving the reliability of the joint between the mount and the base plate. Thus the second semiconductor pressure detecting device of the present invention can be manufactured at a lower cost because the projection welding which can be completed in a shorter period of time can be applied to the manufacture thereof and, because unnecessary stress can be prevented from acting on the semiconductor pressure sensor chip when a pressure is applied during operation, reliability can be improved and relatively high pressures can be measured.

In the second semiconductor pressure detecting device of the present invention, it is preferable that the joint between the first base plate and the second base plate be located inside the periphery of the mount.

This configuration makes it possible to more effectively suppress the deformation of the second base plate due to an extraneous force. Therefore reliability can be more improved and higher pressures can be measured.

DESCRIPTION OF THE PREFERRED EMBODIMENTS

Now preferred embodiments of the present invention will be described below with reference to the accompanying drawings.

Figure 1:
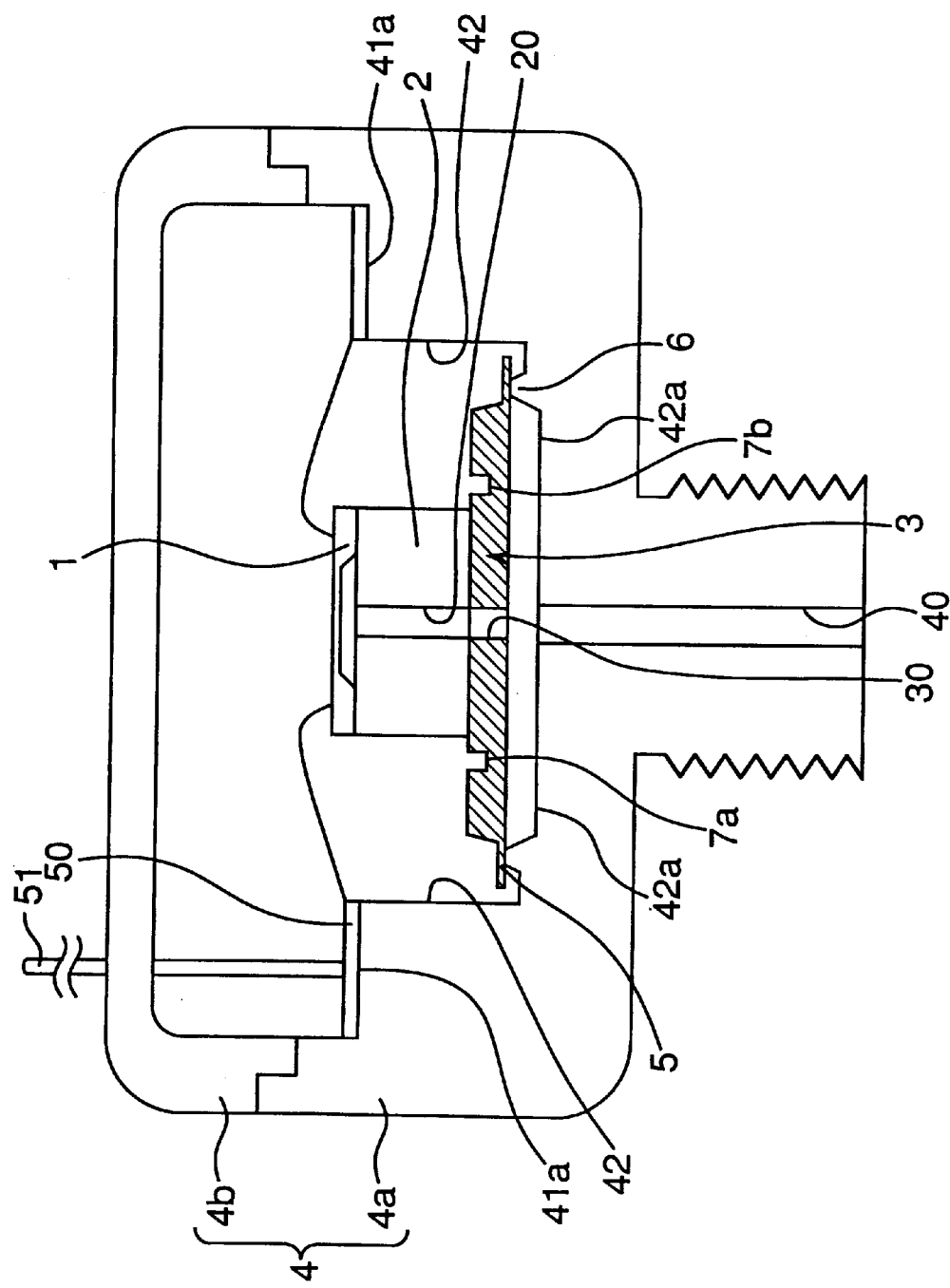
FIG. 1 is a cross sectional view showing the configuration of the semiconductor pressure detecting device according to the first embodiment of the present invention.

FIG. 1 is a schematic cross sectional view showing the configuration of a semiconductor pressure sensor according to first embodiment of the present invention. The semiconductor pressure sensor is made by mounting a semiconductor pressure sensor chip 1 in a package 4 as described below.

First, components of the semiconductor pressure detecting device of the first embodiment will be described.

(1) The semiconductor pressure sensor chip 1 comprises a silicon substrate with a bridge circuit consisting of diffused resistor being formed in a thin-wall portion thereof, wherein a pressure applied to the thin-wall portion causes a change in the resistance corresponding to a strain, and the change in the resistance brings the bridge circuit out of balance, thereby giving an electrical signal output which corresponds to the applied pressure.

(2) The package 4 comprises a package body 4a and a package cover 4b, while the package body 4a and the package cover 4b combine to form a space for housing the semiconductor pressure sensor chip 1 therein.

The package body 4a has a pressure introducing hole 40 formed at the center thereof, a recess 42 of cylindrical configuration formed to be concentric with the pressure introducing hole 40, and a ridge 6 being formed on a bottom surface 42a of the recess 42 in circular configuration concentric with the recess 42 for the purpose of welding.

Figure 2:
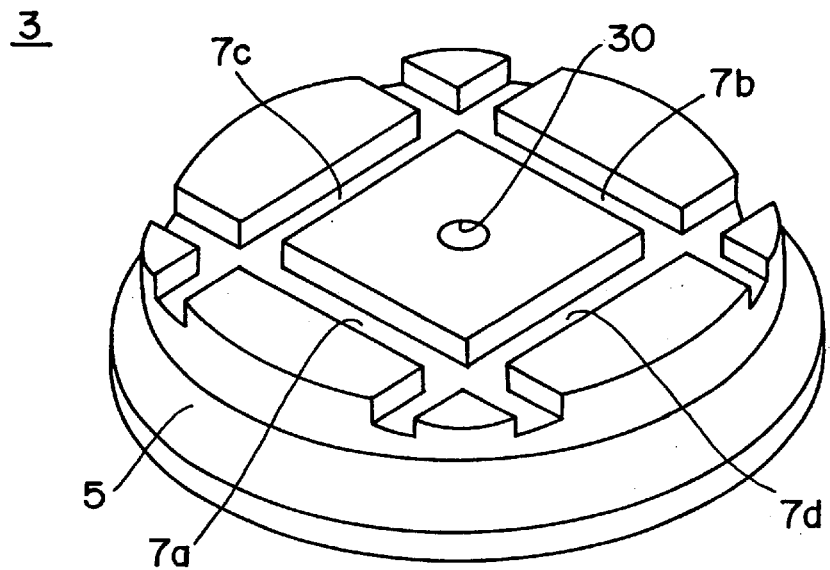
FIG. 2 is a perspective view of the base plate of the first embodiment.

(3) The base plate 3 is formed in substantially disk shape as shown in FIG. 2, and has a through hole 30 at the center and a thin-wall portion 5 on the periphery thereof. In the first embodiment, outer diameter of the base plate 3 is made a little smaller than the recess 42, and the thin-wall portion 5 is formed to position on the ridge 6 for welding when the base plate 3 is placed on the bottom surface 42a.

Further the base plate 3 has grooves being formed therein to surround the through hole 30. That is, in the first embodiment, grooves 7a, 7b which are parallel to each other are formed to interpose the through hole 30, and grooves 7c, 7d which are parallel to each other and substantially at right angles to the grooves 7a, 7b are formed to interpose the through hole 30, thereby forming a groove of square configuration to surround the through hole 30.

(4) The mount 2 is made of a column of Si, glass or the like having a through hole 20 formed at the center. The mount 2 is formed to have a cross sectional configuration similar to that of the semiconductor pressure chip 1, and the cross section has ordinarily a rectangular shape.

According to the present invention, outer diameter of the mount 2 is made smaller than one side of the square so that the mount 2 is located inside the square groove which surrounds the through hole 30. According to the present invention, it is preferable to make the cross sectional configuration of the mount 2 and the cross sectional configuration of the inside of the square groove surrounding the mount 2 substantially the same, in order to effectively mitigate the stress by means of the groove. The term "substantially the same" in the above description means that, for example, variation in the dimension is within a tolerance of about 0.5 mm which is the variation in the manufacturing, for example, assembly step.

The semiconductor pressure sensor of the first embodiment is manufactured by mounting the base plate 3, the mount 2, the semiconductor pressure sensor chip 1 and a circuit substrate 50 on the package body 4a which is formed as described above, providing necessary wiring thereon, and installing the package cover 4b.

More specifically, in the first embodiment, the base plate 3 is mounted on the package body 4a so that the through hole 30 becomes substantially concentric with the pressure introducing hole 40, and is fastened by projection welding of the thin-wall portion 5 and the ridge 6.

The mount 2 is bonded onto the base plate 3 so that the through hole 20 and the through hole 30 are arranged substantially concentrically and located inside the square groove which surrounds the through hole 30.

The semiconductor pressure sensor chip 1 is fastened onto the mount 2 by means of an adhesive or the like so that the thin-wall portion wherein the diffused resistor is formed is located right above the through hole 20. The semiconductor pressure sensor chip 1 is provided with necessary internal wiring by means of wire bonding or the like, while detected signals are output via a peripheral wiring 50 and an output terminal 51 provided on a flat peripheral portion 41a of the package body 4a.

In the semiconductor pressure sensor of the first embodiment made as describe above, because the groove is formed around the portion where the mount 2 is bonded onto the base plate 3 to surround the mount 2, stress exerted on the base plate 3 as a whole can be absorbed thereby decreasing the deformation due to the stress in the portion inside the square groove (namely the portion where the mount 2 is mounted). Therefore, the semiconductor pressure sensor of the first embodiment has various favorable effects as described below.

(1) Even when measuring a relatively high pressure, the deformation of the base plate 3 caused by the pressure can be prevented from being transmitted to the semiconductor pressure sensor chip 1, and therefore the high pressure can be measured without error caused by the deformation of the base plate 3.

(2) In the semiconductor pressure sensor of the first embodiment, stress due to impact and heat caused by the welding process can be prevented from being transmitted to the mount 2 thereby making it possible to prevent breakage of the joint of the mount 2 and the base plate 3. Therefore, the semiconductor pressure sensor of the first embodiment can be manufactured at a low cost by means of the projection welding which takes shorter time than the laser welding and other processes.

In the semiconductor pressure sensor of the first embodiment, the groove which surrounds the through hole 30 is formed in square configuration, although the groove of the present invention is not limited to square configuration and may be formed in other polygonal shape, circle or other configuration. However, square configuration is preferred in order to effectively absorb the stress acting on the base plate 3.

Embodiment 2

Figure 3:
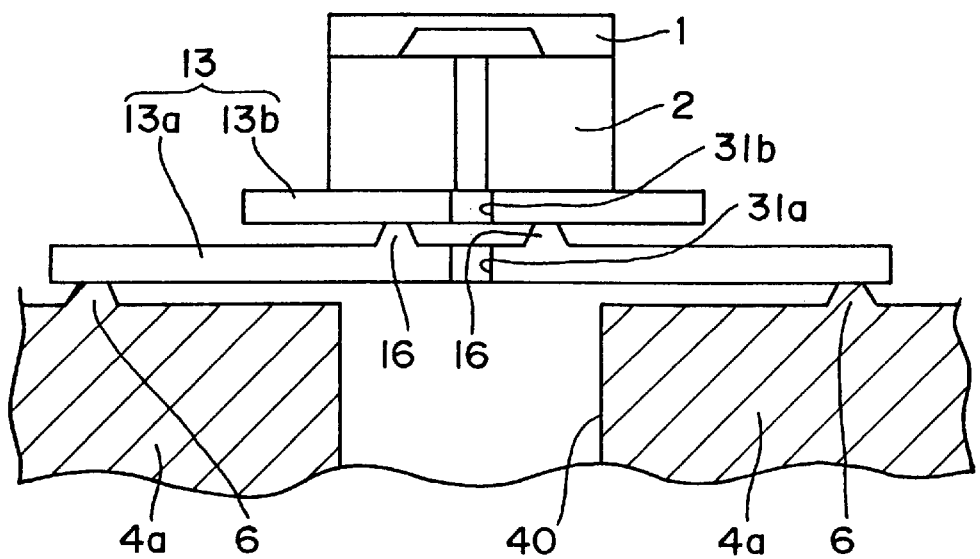
FIG. 3 is a partially cutaway view showing the configuration of the semiconductor pressure detecting device according to the second embodiment of the present invention.
Figure 4:
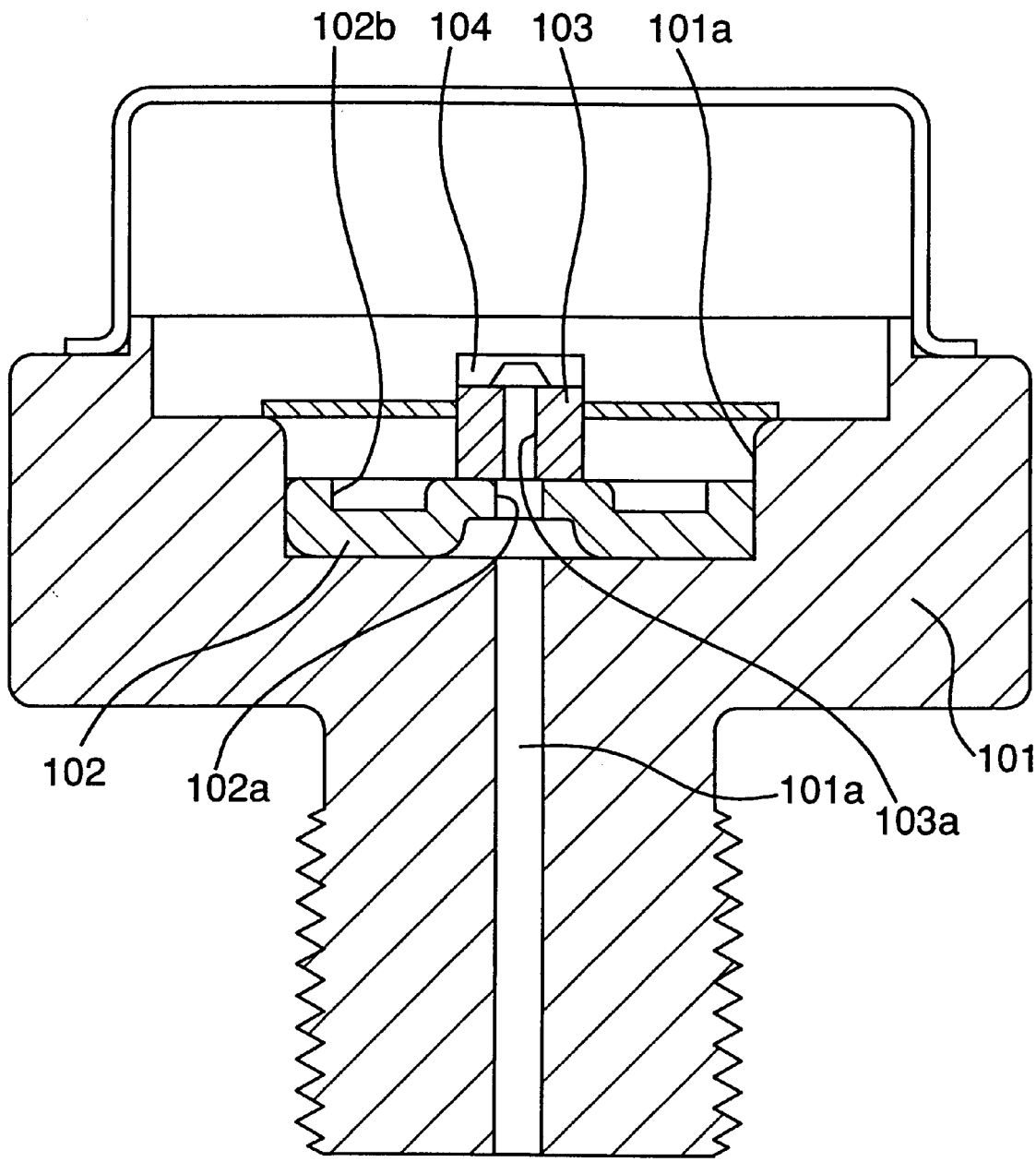
FIG. 4 is a cross sectional view showing the configuration of the semiconductor pressure detecting device of the prior art.

FIG. 3 is a partially cutaway view showing the configuration of the semiconductor pressure sensor according to the second embodiment of the present invention, and gives enlarged view of portions of a base plate 13, the mount 2 and the semiconductor pressure sensor chip 1 which are mounted on the package body 4a.

In the semiconductor pressure sensor of the second embodiment, the base plate 13 comprises a first base plate 13a and a second base plate 13b as shown in FIG. 3, and is bonded onto the package body 4a as described below.

The first base plate 13a has a disk shape with a through hole 31a formed at the center thereof, and is placed on the package body 4a so that the through hole 31a becomes concentric with the pressure introducing hole 40 of the package body 4a. The first base plate 13a is welded at the periphery of the bottom surface thereof onto the ridge 6 formed concentrically with the pressure introducing hole 40 on the package body 4a. The first base plate 13a has a ridge 16 formed on the top surface thereof concentrically with the through hole 31a. In the second embodiment, diameter of the circle of the ridge 16 is made smaller than the circle of the ridge 6 of the package body 4a, and is smaller than the outer diameter of the second base plate 13b.

The second base plate 13b has a disk shape with a through hole 31b formed at the center thereof, and is placed on the first base plate 13a so that the through hole 31b becomes concentric with the through hole 31a of the first base plate 13a. The second base plate 13b is welded on the bottom surface thereof onto the ridge 16 formed on the first base plate 13a.

The semiconductor pressure sensor chip is mounted on the second base plate 13b via the mount 2.

In the semiconductor pressure sensor of the second embodiment made as described above, the base plate 13 is made up of the first base plate 13a and the second base plate 13b, and the diameter of the ridge 16 of the first base plate whereon the second base plate 13b is welded is made smaller than the diameter of the ridge 6 of the body 4a whereon the first base plate 13a is welded, and therefore deformation of the second base plate 13b can be made smaller than deformation of the first base plate 13a caused by an extraneous force, and hence various effects as described below can be achieved.

(1) The semiconductor pressure sensor of the second embodiment can, even when measuring a relatively high pressure, reduce the deformation of the second base plate 13b caused by the pressure, and is therefore capable of measuring the high pressure without error caused by the deformation of the base plate 13.

(2) In the semiconductor pressure sensor of the second embodiment, the deformation of the second base plate 13b caused by stress due to impact and heat generated during the welding process can be reduced, and therefore it is made possible to prevent breakage of the joint of the mount 2 and the base plate 13. Therefore, the semiconductor pressure sensor of the second embodiment can be manufactured at a lower cost by means of the projection welding which takes shorter time than the laser welding and other processes.

In the semiconductor pressure sensor of the second embodiment, it is preferable to make the diameter of the ridge 16 formed on the first base plate 13a smaller than the diameter of the mount 2 as shown in FIG. 3, in order to effectively minimize the deformation of the second base plate 13b due to the extraneous force.

We claim:

1. A semiconductor pressure detecting device comprising:

a package having a pressure introducing hole;

a base plate which has a first through hole at the center thereof and is bonded on the periphery thereof to the inside of the package so that said first through hole becomes substantially concentric with said pressure introduction hole;

a mount which has a second through hole at the center thereof and is mounted on said base plate so that said second through hole becomes substantially concentric with said first through hole and located inside the bonding portion of said package and said base plate; and a semiconductor pressure sensor chip for detecting a pressure introduced through said pressure introduction hole made in said mount, said first through hole and said second through hole;

wherein said base plate has a groove which surrounds the mount at a position inside of said bonding portion.

2. A semiconductor pressure detecting device according to claim 1;

wherein said groove comprise a first groove and a second groove formed to oppose each other while interposing said mount, and a third groove and a fourth groove formed to oppose each other which are formed to interpose said mount and are substantially at right angles to said first groove and said second groove, respectively.

3. A semiconductor pressure detecting device comprising:

a package having a pressure introducing hole;

a base plate which has a first through hole at the center thereof and is bonded at the periphery thereof to the inside of said package so that said first through hole becomes substantially concentric with said pressure introduction hole;

a mount which has a second through hole at the center thereof and is mounted on said base plate so that said second through hole becomes substantially concentric with said first through hole and located inside the bonding portion of said package and said base plate; and a semiconductor pressure sensor chip mounted on said mount for detecting a pressure introduced through said pressure introduction hole made in said mount, said first through hole and said second through hole;

wherein said base plate comprises a first base plate which is bonded onto said package at the periphery of the bottom surface thereof and a second base plate which is bonded onto said first base plate inside the periphery of the top surface of said first base plate, and said semiconductor pressure sensor chip is mounted on said second base plate via said mount.

4. A semiconductor pressure detecting device according to claim 3;

wherein the joint between said first base plate and said second base plate is located inside the periphery of said mount.

* * * * *